Figure 1A:
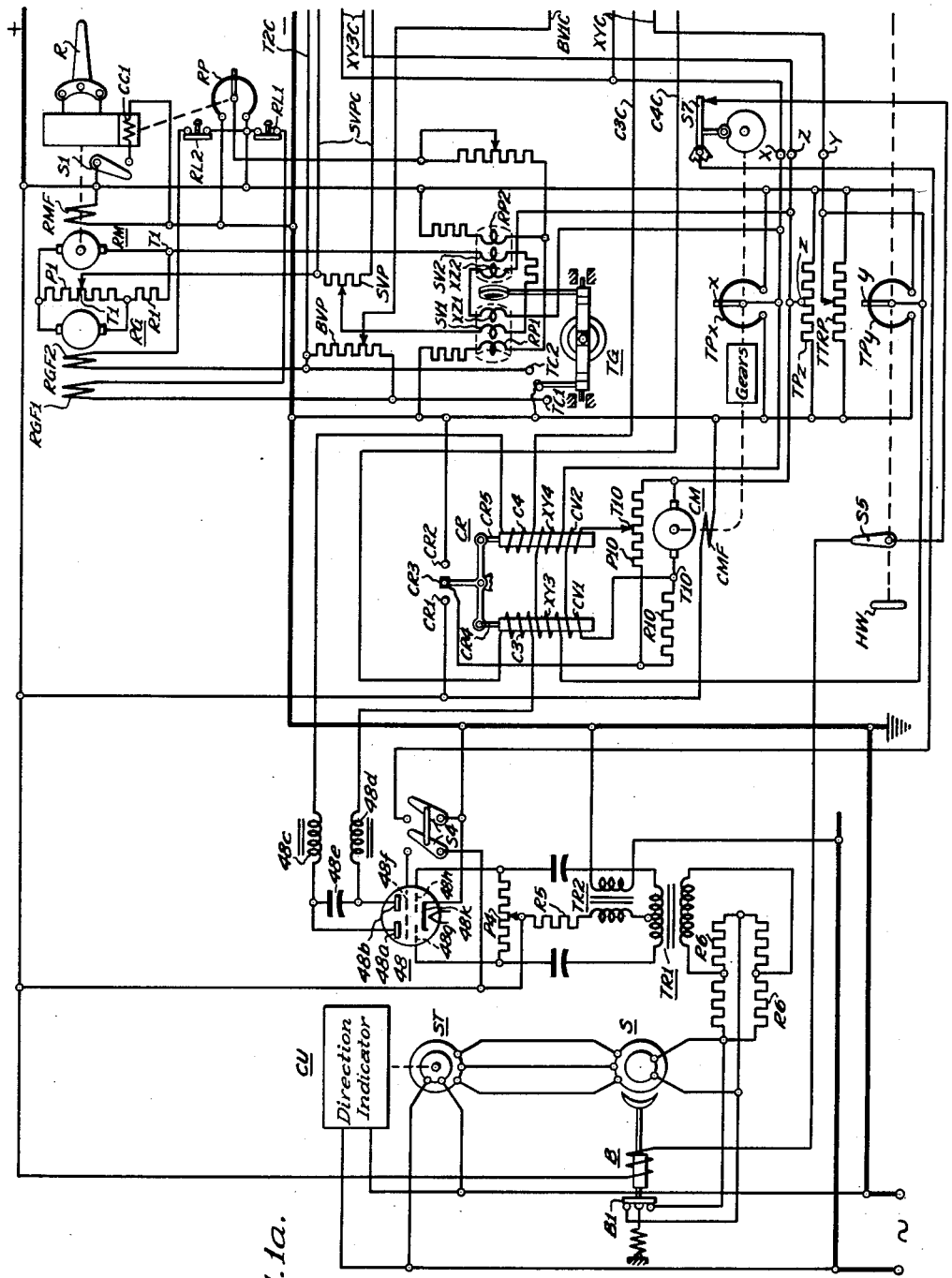

April 8, 1952     I. M. HOLLIDAY     2,591,938
GYROSCOPE CONTROL SYSTEM FOR DIRIGIBLE CRAFT
Filed Dec. 11, 1947     2 SHEETS—SHEET 1

WITNESSES:
Robert C. Bird
E. F. Oberheim

INVENTOR
Ivar M. Holliday.
BY
Paul E. Friedemann
ATTORNEY

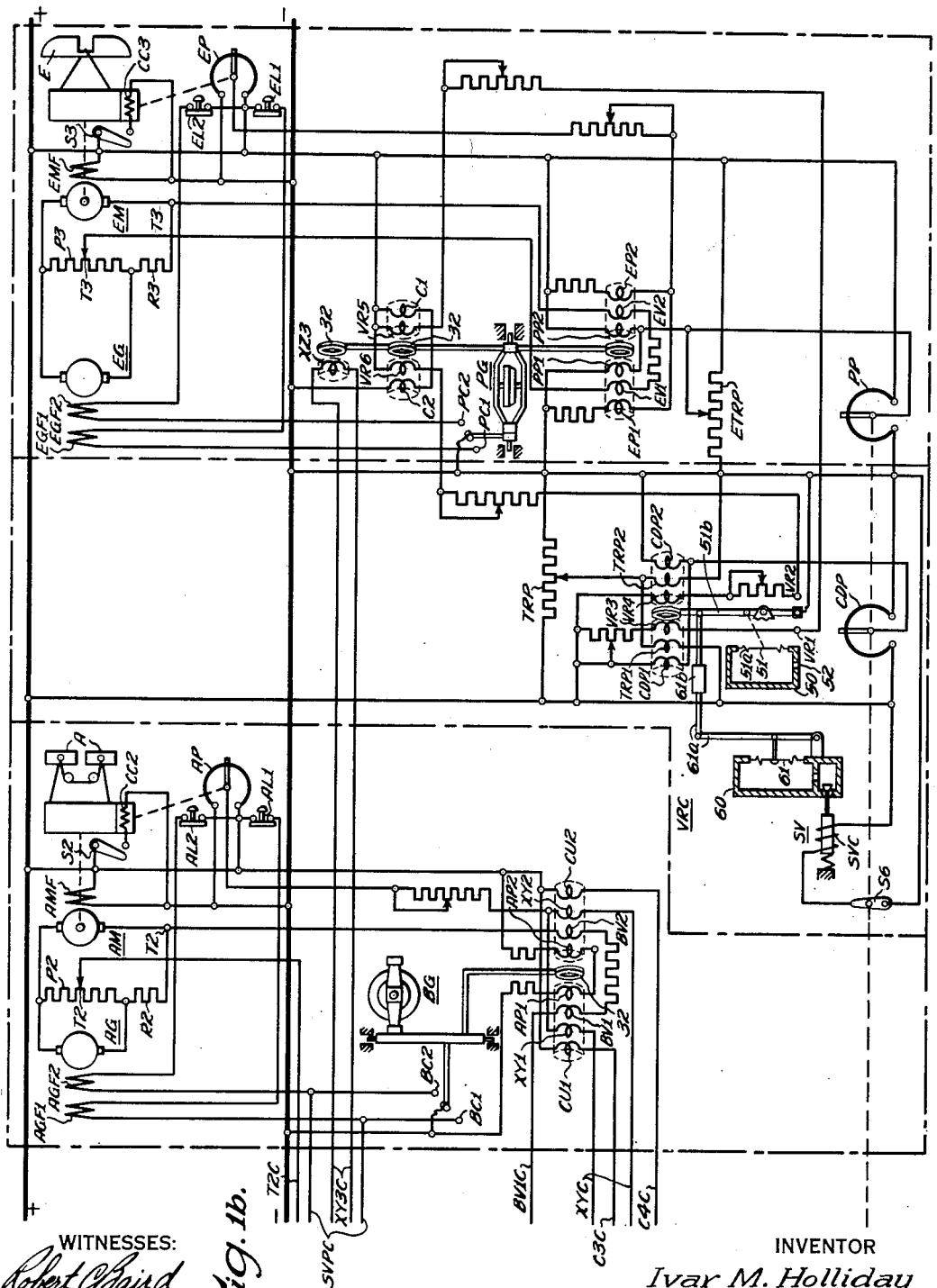

Patented Apr. 8, 1952

2,591,938

UNITED STATES PATENT OFFICE 2,591,938

GYROSCOPE CONTROL SYSTEM FOR DIRIGIBLE CRAFT

Ivar M. Holliday, Pittsburgh, Pa., assignor to Westinghouse Electric Corporation, East Pittsburgh, Pa., a corporation of Pennsylvania Application December 11, 1947, Serial No. 791,106

11 Claims. (Cl. 244—77)

This invention relates generally to systems of control and more particularly to control systems applicable in the control of conveyances operable in space.

The invention is herein illustrated and described as applied in the control of a conventional aircraft utilizing rudders, elevators and ailerons, respectively, for controlling the craft directionally, longitudinally and laterally. However, it will be appreciated that the present invention may be applied to other types of craft utilizing means other than the control surfaces mentioned for effecting maneuverability.

In certain of its aspects this invention relates to a copending application of C. R. Hanna, Serial No. 785,983, filed November 14, 1947, entitled Control Systems, and assigned to the same assignee as this invention.

In certain other of its aspects this invention is related to a copending application of C. R. Hanna and K. A. Oplinger, Serial No. 785,985, filed November 14, 1947, entitled Control Systems, and also assigned to the assignee of this invention.

In yet other of its aspects this invention is related to a copending application of C. R. Hanna, Serial No. 791,105, filed on the same date as this application, entitled Control Systems, and also assigned to the present assignee.

In order that the present invention may be fully appreciated, it is essential that the fundamental principles of flight control be understood.

The control of an aircraft may be resolved about three mutually perpendicular axes. One is a vertical axis about which yawing or turning movement of the craft takes place, such movement being effected by the application of left or right rudder for a turn to the left or to the right. A second axis disposed longitudinally of the craft and perpendicular to the turn axis is termed the roll axis about which the aircraft rotates. Movement about the roll axis is controlled by the ailerons which are simultaneously operated in opposite directions, that is one moves up as the other moves down, to produce cumulative torques about the roll axis for banking the craft. The third axis passes laterally of the craft perpendicular to the aforenamed axes at the point of intersection thereof and is termed the pitch axis of the craft. Control of the craft about the pitch axis for a dive, a climb or for level flight is afforded by the elevators which tilt the craft longitudinally about the pitch axis to change the angle of attack of the wing airfoil and as a consequence the direction of flight of the craft in a vertical plane.

In still air when the aircraft is oriented so that its roll and pitch axes are horizontal, it will tend to follow a course which is the projection of the longitudinal axis. But whenever the craft is rotated about one or more of the three control axes, either by the application of one or more of its control surfaces or by air disturbances, the flight path as a rule changes.

It is important to note, and this is particularly true of the ailerons, that the position of the control surfaces does not determine the position of the aircraft about any of the control axes, but rather determines the velocity of movement about the corresponding axis. Thus in maneuvering the craft, it is necessary to perform double operations in the application of the control surfaces. In a simple turn, for instance, first the application of the control surfaces is made in a direction to cause the craft to assume the desired attitude in flight after which the ailerons are usually returned to a neutral or streamlined position and the rudder and elevators streamlined to a lesser extent. A return to level flight is then effected by a reverse movement of the ailerons and movement of the rudder and elevators to their neutral positions.

To properly execute a turn in an aircraft it is essential that movement of the control surfaces be coordinated. Too much rudder will cause the craft to skid outwardly in a turn, too much aileron will cause side slipping, while insufficient application or over application of the elevators during a turn will tend to cause, respectively, diving and to a lesser degree climbing.

In addition to the above-described proportioning of control surface movement which must be effected, there is also the consideration of suitable time delays in the application or removal of rudder and elevators in the execution of simple turns. The ability of an aircraft to be turned by simple application of the rudder depends in some measure upon the aerodynamics thereof. An inherently stable craft upon the application of rudder and the skidding movement which follows will tend to accumulate the bank angle necessary for equilibrium in the indicated turn. However, in any case a turn may not be executed satisfactorily in the absence of a blank angle. Thus for a co-ordinated turn it will be appreciated that the application of the rudder should be proportional to the angle of bank and should follow as the bank angle for the desired turn is accumulated. A suitable co-ordination of movement of the ailerons and rudder, therefore, effects an application of the ailerons to produce the desired velocity of rolling movement about the roll axis to the desired angle of bank and the application of the rudder to produce the necessary turn velocities indicated by the instantaneous angles of bank.

The considerations involved in the control of the elevators are analogous to those for the control of the rudder. Premature application of the elevators when entering a turn will cause the aircraft to climb, while premature removal thereof coming out of a turn will cause the aircraft to dive. The application of up-elevator for a turn in either direction may be viewed as compensating for the reduction in horizontal lifting surface of the wing for a given angle of bank, by increasing the angle of attack of the airfoil to increase the lift. Thus, as in the case of the rudder, the angle of bank indicates the pitch velocity of the aircraft in a turn and co-ordination of control requires that the elevators be applied and removed as the angle of bank is increased or decreased.

The time delay in acquiring a given bank angle depends upon the characteristics of the particular aircraft, for instance, the aerodynamic properties and the mass. In general, the larger the craft the longer will be the time delay. Additionally, in a given craft this delay will vary depending upon the degree of application of the ailerons which determines the roll velocity.

The control arrangement of this invention embodies rate gyroscopes, one for each of the three control axes, which are disposed to respond to the velocity of motion of the craft about the corresponding one of the three axes. Details of such a gyroscope unit appear in the hereinbefore mentioned application of C. R. Hanna, Serial No. 785,983. In the present disclosure these gyroscopes are controlled by suitable biasing magnets which in part are controlled by the handwheel operated by the human pilot through a transient turn co-ordinator which produces a set of voltages for the biasing magnets of the three gyroscopes in such time phase relation as to effect co-ordinated turning of the craft for any setting of the handwheel, such a system appearing in the mentioned application of C. R. Hanna and K. A. Oplinger, Serial No. 785,985. In each of the hereinabove mentioned applications, a course control unit is provided to which that portion of the overall control including the rate gyroscopes is slaved during periods of fixed course control and provision is made for controlling the biasing magnets of the turn rate gyroscope from the course control unit to maintain the craft on a given course. At the same time provision is made to effectively disconnect the course control unit from the rate gyroscope system during periods of manually initiated turns as an automatic consequence of handwheel rotation.

Inasmuch as the transient turn co-ordinator affiords co-ordinated turning of the aircraft in response to handwheel rotation, it is a desirable expedient to also control the craft from the course control unit during periods of fixed course control, through the transient turn co-ordinator and it is generally to such a system of control that the present invention is directed.

One object of this invention is to provide a system of control for a conveyance operable in space which affords a control of the control means for maneuvering the conveyance, of a character to maintain the conveyance in equilibrium.

More specifically it is an object of this invention to provide a control system of the character referred to including a gyroscopically controlled stabilizing system and a course control unit in which the stabilizing system is controlled by the course control unit in a manner to maintain the craft in equilibrium.

Still more specifically it is an object of this invention to provide a system of control for an aircraft in which the ailerons, elevators and rudders are all under the control of a course control unit during periods of fixed course operation and provision is had for disconnecting the course control during periods of manually initiated control.

The foregoing statements are merely illustrative of the various aims and objects of this invention, other objects and advantages will become apparent upon a study of the following disclosure when considered in conjunction with the accompanying drawings in which:

Figs. 1a and 1b together diagrammatically illustrate a system of control for an aircraft, embodying the principles of this invention.

An important function of an aircraft flight control system or automatic pilot is to fly the aircraft straight and level at a given altitude. To this end the control must be quick to sense minor departures of the craft from fixed reference positions and/or to sense velocities about any of the three control axes to maintain a predetermined mode of operation. Additionally it is desirable that the control in response to stimuli of a piloting means manipulatable by the human pilot shall afford a co-ordination of control surface movement causing the craft to execute the maneuver indicated by the piloting means while maintaining the craft in equilibrium throughout the maneuver.

Control systems directed to accomplishing this end usually include gyroscopes to detect errors in position of the craft. Such gyroscopes have been of the position type, that is, gyroscopes disposed on the craft to detect changes in flight attitude and to produce signals which when applied to suitable servo systems operating the control surfaces, tend to restore the aircraft to the desired flight attitude. Gyroscopes of this type however by reason of their mounting have a limited degree of freedom and, therefore, limit the maneuverability of the craft. If the maneuverability limit is exceeded the spin axis of the gyroscope is rotated with the craft about a given axis angularly deflecting the plane of the gyroscope rotor and the resulting precessional response causes "tumbling" of the affected gyroscope or gyroscopes rendering the control useless.

A better control is obtainable by the use of velocity type gyroscopes which respond to the velocity of motion of the craft about the control axes thereof. Each produces an output torque proportional to the input velocity. Therefore, the output torque is usable in a control of the craft to check velocity errors about any of the control axes. Additionally by the introduction of suitable biasing means to the gyroscopes a controlled output thereof may be initiated to effect a control of the craft in the execution of certain maneuvers.

There are several advantages inherent in the provision of such a control. Importantly among these is the fact that a control may be provided which is responsive to the output torque of the gyroscope requiring negligible gyroscope output motion for operation. Hence the motion of the gyroscope about the output axis thereof may be limited. Since the input axis of such a gyroscope is constituted in a control axis of the aircraft, that is, the gyroscope is secured to the craft to respond to velocities or rates of motion about a given control axis, the limitation of output motion results in a restrained mounting thereof preventing the gyroscope from tumbling irrespective of the flight attitude of the aircraft. Thus, with a system of neutral gyroscopes, that is, gyroscopes which are balanced about the output axis thereof, any type of maneuver may be executed by the application of a suitable biasing control to the gyroscopes, there being no maneuverability limit to the gyroscopes.

Another important advantage resulting from the control afforded by the velocity type gyroscopes is that a fast response to errors is had. Since a rate of motion must occur before an actual displacement may occur about any of the control axes, it is possible to produce a suitable force or torque on the craft tending to oppose that producing the velocity error or disturbance without waiting for an actual displacement to occur. By suitably proportioning the control resulting from the velocity sense of the gyroscopes it is possible to provide a control in which the actual excursions in position are of a minor nature and noticeable position errors may accumulate only over relatively long periods of time. Such errors may be corrected upon periodic checking of course and altitude by the human pilot. However, adequate control in some cases may require that a system of control as herein disclosed be capable of correcting position errors. Hence means are herein provided for imparting directivity to each of the velocity type gyroscopes employed.

The system illustrated in the drawings embodies the velocity or rate gyroscopes mentioned above. One a turn rate gyroscope TG controls a servo system including the rudder generator RG and the rudder motor RM which is connected to drive the rudder R of the aircraft through a system of gears. The second, a bank or roll rate gyroscope BG controls a servo system including the aileron generator AG and aileron motor AM which drives the ailerons A; and the third, a pitch rate gyroscope PG controls a servo system including the elevator generator EG and the elevator motor EM which drives the elevators E. Each gyroscope is oriented in the aircraft to respond to the rate of motion thereof about the corresponding control axis, the direction of flight being indicated by the arrow adjacent each gyroscope and the gyroscopes appearing as viewed from the side of the aircraft, that is, in elevation. A detailed discussion of the gyroscopes is given in the copending application of C. R. Hanna, Serial No. 785,983, only such details being hereinafter presented as are deemed essential to an understanding of this invention.

As illustrated and excluding the spin axis, each gyroscope has freedom for gyroscopic response about a single axis, otherwise the gyroscope is secured to the aircraft. Thus it will be observed that the turn gyroscope is sensitive only to angular motion about the turn axis of the aircraft, the turn axis lying in the plane of the drawing and being perpendicular to the axis about which the turn gyroscope is pivoted, which axis constitutes the output or precession axis of the turn gyroscope. The pitch gyroscope PG is similarly disposed, its output or precession axis being perpendicular to the pitch axis of the aircraft which is a line perpendicular to the plane of the drawings. The same applies to the bank gyroscope BG having its axis of freedom disposed at a right angle to the roll or bank axis of the aircraft which is a horizontal line in the plane of the drawings. In each case it will be observed that a rate of motion of the aircraft about any one of the turn, roll or pitch axes, applies a torque to the corresponding gyroscope tending to angularly displace the spin axis thereof. Accordingly, each gyroscope, having a degree of angular freedom about an output axis at right angles to the axis of the applied torque, produces an output torque representative of the input velocity, and the output torque is herein utilized to produce suitable control quantities for operating the associated servo system.

There are several ways in which the gyroscope output torques may be utilized to produce electrical quantities. For instance, the torque may be applied through a mechanical linkage to a carbon pile unit or other type of variable resistance unit to control the resistance thereof. The present embodiment of Figs. 1a and 1b utilizes a contact set comprising a pair of opposed stationary contacts having a movable contact secured to the gyroscope radially of the output axis thereof, disposed therebetween. Thus, in the case of the turn gyroscope precessional motion selectively engages the movable contact with either of contacts TC1 or TC2 which are, respectively, connected in series with one of a pair of differentially related field windings RGF1 and RGF2 on the rudder generator RG. The circuit for the field RGF1 extends from the positive conductor (+) through limit switch RL1 controlled by the rudder potentiometer RP, through the field RGF1 to contact TC1 and thence to the movable contact and the negative conductor (—). Similarly the circuit for field RGF2 extends from the positive conductor (+) through limit switch RL2 actuated by the rudder potentiometer RP, through field RGF2 to contact TC2 and thence to the movable contact and the negative conductor (—). The bank and pitch gyroscope contact circuits are the same as that of the turn gyroscope, aileron generator field AGF1 being connected in series with limit switch AL1 actuated by the aileron potentiometer AP and bank contact set BC1 across the power supply and field AGF2 being connected in series with limit switch AL2 and bank contact set BC2 across the power supply. Similarly elevator generator field EGF1 is connected in series with limit switch EL1 actuated by elevator potentiometer EP and the pitch contact set PC1 and field EGF2 is in series with limit switch EL2 and pitch contact set PC2, both series circuits being connected across the power supply.

The function of the gyroscope contacts in controlling the excitation of the field circuits of the generators is not simply that of making and breaking the circuit to the selected field but also that of controlling the current magnitudes in these circuits. This is accomplished by controlling the contacts so that hovering operation obtains in dependence of gyroscope output torques, suitable electromagnetic biases about the output axis of each gyroscope, and a degree of dynamic unbalance in the rotating system of the respective gyroscopes. By this means average currents are caused to flow in the field circuits corresponding to the detected error velocity about the corresponding control axis of the aircraft or corresponding to a set in turn rate at the handwheel HW.

The mentioned electromagnetic biases are produced by sets of electromagnets having armatures secured to the respective gyroscopes radially of their output axes. The specific structure of the electromagnets is not illustrated but reference may be had to the mentioned application of C. R. Hanna, Serial No. 785,983 for these details. Generally, the electromagnets are designed with overlapping cores and armatures so that appreciable changes in air gaps with armature movement do not occur over the limited range of armature motion so that the magnet force is independent of the armature position with respect to the magnet core, minimizing negative stiffness. Each magnet comprises a cylindrical core (not shown) having one extremity thereof projecting beyond the coil or coils wound thereabout. In the magnet systems shown in the drawings the cores are disposed in opposed relation and an annulus 32 of magnetic material forming the armature is secured to the associated gyroscope as previously described. The armature 32 surrounds the core structures at the air gap formed between the confronting extremities of the cores, the axial length of the armature being sufficient that overlapping of the cores thereby exists throughout the limited range of armature motion.

The electromagnetic biases are produced by feedback voltages and control voltages applied to the respective coils of the magnets. The precessional response of each gyroscope is damped by a feedback voltage representative of the velocity of operation of the motor of the corresponding servo system. To this end each motor is connected as one leg in a bridge circuit which is balanced against the resistance of the motor armature winding when the motor is not rotating. Thus, when the motors drive the corresponding control surfaces to equilibrium position and stop the currents circulating in the bridge, circuits are balanced and the output voltage of each bridge is zero. However, during rotation, the back E. M. F. of the respective motors increases the apparent armature resistance unbalancing the bridge circuit and producing an output voltage. Inasmuch as the motor fields RMF, AMF and EMF for the rudder motor, the aileron motor and the elevator motor are maintained at constant voltage across the power supply, the back E. M. F. varies in magnitude and direction with the motor speed and direction of rotation producing a velocity voltage across the output terminals of each bridge circuit. The bridge circuit for the rudder motor includes a potentiometer P1 of which the tapped portions form adjacent legs and the remaining adjacent legs are formed by the resistor R1 and the armature winding of the rudder motor. Generator RG is connected across potentiometer P1 the extremities of which form the bridge circuit input terminals while terminals T1 formed by the tap of potentiometer P1 and the point between resistor R1 and the motor armature winding constitute the output terminals. The armature winding of aileron motor AM likewise forms one leg of a bridge circuit energized by generator AG and including a potentiometer P2 and a resistor R2, the output terminals being designated T2. Similarly the armature winding of the elevator motor EM forms one leg of the bridge including potentiometer P3 and resistor R3 which is energized by generator EG and has for its output terminals the terminals T3. In each instance the velocity voltage taken from the respective bridge circuits is fed back in a negative sense, that is, the electromagnetic bias resulting from the velocity feedback voltage opposes the precessional response of the corresponding rate gyroscope.

A second feedback voltage for each gyroscope is taken, respectively, from the potentiometers RP, AP and EP, the movable taps of which are driven by the corresponding servo systems through electromagnetically operated clutches having coils CC1, CC2 and CC3 which are respectively energized from the power supply upon closure of switches S1, S2 and S3. Since the potentiometers are each actuated by a motor driving a control surface of the aircraft, the position of each movable tap and, hence, the tapped voltage corresponds to the position of the associated control surface. Thus the response of each gyroscope is also controlled in dependence of control surface position.

In order to obtain co-ordination of control surface movement during the execution of turns, the turn and bank gyroscopes TG and BG are additionally biased by voltages taken, respectively, from a skid voltage potentiometer SVP and a bank voltage potentiometer BVP, which are, respectively, connected in the field circuits of the aileron and rudder generators to be energized in dependence of the currents circulating therein when a set of the associated gyroscope's contacts is closed. For instance, regarding the skid voltage potentiometer SVP, when the contact BC1 is engaged by the movable contact actuated by gyroscope BG to energize field AGF1, a circuit for energizing skid voltage potentiometer SVP is completed beginning with the positive conductor (+) and including limit switch AL2, generator field AGF2, potentiometer SVP, contact BC1 and the movable contact engaged therewith to the negative conductor (−). Engagement of the movable contact with contact BC2 energizes the potentiometer SVP in a reverse direction in a circuit including the generator field AGF1 and limit switch AL1. Analogous considerations apply to the bank voltage potentiometer BVP. Thus upon the operation of either of the bank or turn gyroscopes to control the associated control surface the other gyroscope is biased in a direction to effect co-ordinated application of its control surface.

The turn bank and pitch gyroscopes are additionally biased by voltages obtained from potentiometers controlled by handwheel HW under the control of the human pilot. These potentiometers are designated TP$x$, TP$y$ and TP$z$ of which TP$y$ is actuated by the human pilot, TP$x$ is driven by a follow-up motor control responsive to the differential voltage across the taps of potentiometers TP$y$ and TP$x$ and potentiometer TP$z$ is provided with a fixed tap. The details of this potentiometer system will be hereinafter considered. But at this point it is sufficient to note the function thereof.

To execute a turn the pilot actuates the handwheel HW in rotation displacing the tap $y$ along potentiometer TP$y$. The voltage between the tap $y$ and the tap $x$ of potentiometer TP$x$ causes operation of the control motor CM driving movable tap $x$ in a direction to match the tap voltage at $x$ with that at $y$ tending to reduce this voltage to zero at a preselected rate. All three potentiometers are so aligned for straight away flight that the tap voltages $y$ to $x$ and $x$ to $z$ are zero and turn trim potentiometer TTRP having its adjustably fixed tap common with tap $y$ of potentiometer TP$y$ is utilized to correct off-center conditions. Hence motion of tap $x$ to balance the tap voltage at $y$ produces a voltage $x$ to $z$ which increases at the rate at which the $y$ to $x$ voltage is decreased. Both the $y$ to $x$ and $x$ to $z$ voltages, it will be observed, reverse polarity depending upon the direction of rotation of handwheel HW from neutral position. Voltage $y$ to $x$ which is the first to occur is used to bias the bank gyroscope BG and voltage $x$ to $z$ which builds up substantially as the voltage $y$ to $x$ decreases, is applied to the turn and pitch gyroscope. The biasing systems of the turn and bank gyroscopes are polarity sensitive and, hence, bias the associated gyroscopes one way or the reverse depending upon the polarity of the biasing voltages. On the other hand, the section of the biasing system for the pitch gyroscope receiving the voltage $x$ to $z$ is not polarity sensitive and is arranged in its response to produce up-elevator for both polarities of voltage $y$ to $z$.

Additionally it has been found that the pitch velocity in a turn varies substantially as the square of the angle of bank within a range of bank angles approaching 45° in either direction from the horizontal. Since the position of the elevators controls the pitch velocity suitable up-elevator control requires that the elevators be applied approximately in accordance with the mentioned square law relation of bank angle and pitch velocity. In the instant case this is accomplished by providing linear response biasing systems for the turn and bank gyroscopes and a square law response biasing section in the pitch gyroscope biasing system to produce the needed up-elevator for the indicated turn.

Considering now the control sequence which occurs upon rotation of the handwheel HW, first the voltage $y$ to $x$ is produced which effects a directed bias of the bank rate gyroscope depending upon the direction of handwheel rotation producing roll in the proper direction at a rate corresponding to the magnitude of the applied voltage. Thus the accumulation of bank angle is initiated. As the follow-up control of potentiometer TP$x$ functions the voltage $y$ to $x$ decreases and voltage $x$ to $z$ appears and increases substantially at the rate or any suitable function of the rate of decrease of voltage $y$ to $x$. Reduction of voltage $y$ to $x$ decreases the bias of the bank gyroscope returning the ailerons to stream-lined position as the proper angle of bank for the indicated turn is approached while the increasing voltage $x$ to $z$ controls the turn and pitch rate gyroscopes to apply the rudder and elevators in time phase with the bank angle to continuously match the turn and pitch velocity with the instantaneous angles of bank.

The pitch gyroscope is also biased by voltages taken from the pitch potentiometer PP. This potentiometer is actuated by push-pull motion of the handwheel affording reversed polarity biasing voltages when the movable tap is moved to opposite sides of neutral position, dives and climbs being executed by push-pull motion of the handwheel.

Directivity is imparted directly to the bank and pitch rate gyroscopes. In the case of the bank gyro this is accomplished by making the gyroscope pendulous about its vertical output axis as illustrated. Thus this gyroscope in addition to responding to rates of motion about the roll axis is also sensitive to lateral acceleration and gravity, tending to assume a position about the vertical output axis thereof corresponding to the resultant of these two quantities. As a consequence the reference position for which this gyroscope initiates rolling motion of the craft corresponds to the proper angle of bank for the actual turn velocity of the craft.

In the case of the pitch gyroscope directivity is obtained from the vertical rate control VRC which produces biasing voltages in dependence of the rate of change of altitude and actual displacements in altitude. The vertical rate control includes a structure 50 having an opening therein forming a chamber which is sealed by a diaphragm 51 supported by a flexible annulus 51a. A small orifice 52 affords communication of the chamber with the atmosphere and diaphragm 51 is, therefore, displaced to the left or to the right as viewed with a force depending upon the rate of movement of the assembly vertically in the atmosphere. Diaphragm 51 is connected with pivoted arm 51b carrying a movable contact at its lower extremity and an armature of an electromagnet assembly at its remaining extremity. The movable contact is disposed between a set of stationary contacts VR1 and VR2 which under the influence of the biasing control of the electromagnet associated therewith are caused to hover during operation. The vertical position reference is provided by the structure including the chamber 60 sealed by diaphragm 61 the motion of which is transmitted to arm 51b by link system 61a including a preloaded spring assembly 61b, the details of which are not shown being well known, and thus also influencing contact operation.

The vertical rate control electromagnet assembly is energized by a dive and climb potentiometer CDP actuated by push-pull motion of handwheel HW. This potentiometer is connected in a bridge circuit with the pair of coils CDP1 and CDP2 in which the tapped portions of the potentiometer form one pair of adjacent legs and coils CDP1 and CDP2 form the remaining pair of adjacent legs. The bridge circuit is connected across the positive and negative conductors and the movable tap of the potentiometer CDP is connected between the coils. Thus motion of the potentiometer tap to either side of center position correspondingly unbalances the coil currents and the armature is biased accordingly to cause engagement of the movable contact with one or the other of contacts VR1 and VR2. Contacts VR1 and VR2 are, respectively, connected in series with coils VR3 and VR4 of the vertical rate electromagnet. The arrangement is such that closure of a contact energizes the corresponding coil tending to open the contact, producing a hovering contact motion in which the electromagnetic biases balance the mechanical biases on arm 51b. The remaining pair of coils TRP1 and TRP2 form adjacent legs of a bridge including the trim potentiometer TRP which is adjustable to compensate off-center conditions. During periods of climbing and diving of the aircraft initiated at the handwheel, switch S6 opened by push-pull handwheel motion deenergizes coil SVC of solenoid valve SV which is spring biased open and provides communication of chamber 60 with the atmosphere.

A directional sense for the system as a whole is obtained from the course control unit generally designated CU. Means for producing the fixed course signal voltages may be of any suitable form. One such means includes a gyro stabilized magnetic compass (not illustrated) embodied in the block entitled Direction Indicator. This type of device includes a magnetic pickup commonly known as a flux valve. Briefly such as compass includes three stationary magnetic members disposed in 120° relation in a horizontal plane so that their permeability is altered by the horizontal component of the earth's magnetic field. When the three members are altered by a single phase alternating current, there is produced in three secondary windings forming part of the magnetic members, a set of voltages having double the applied frequency and which are unbalanced in magnitude depending upon the direction of the earth's magnetic field. Such voltages correspond in every respect to single phase synchro transmitter voltages as the rotor of the synchro transmitter is turned. The voltage pattern of the flux valve is applied to the stator of a single phase synchro control transformer the single phase output of which is amplified and employed to bias the directional gyroscope which in the instant application is of the position type. The bias forces acting about the input axis of the directional gyroscope produce precession movement thereof which by suitable mechanical connection with the rotor of a second synchro control transformer ST effects rotational movement thereof producing a strong output voltage pattern. This output voltage pattern is applied to the stator of a synchro unit S connected in a suitable network whereby a control of the tube 48 is had.

Vacuum tube 48 is provided with a pair of plates connected with the positive side of the source, the circuit for plate 48a including choke coil 48c, coil C4 of relay CR and coil CU2 of the bank gyroscope biasing magnet system. And the circuit for plate 48b includes choke coil 48d, coil C3 of control relay CR and coil CU1 which is arranged on a core opposed to that of coil CU2. Choke coils 48c and 48d together with the shunt connected capacitor 48e form a filter network for the plate circuit tending to provide vibrationless electromagnet control. Suppressor grid 48f is connected to the positive side of the supply source through one blade of switch S4. Control grids 48g and 48h are connected to diagonally opposite terminals of a bridge network including a potentiometer P4 and the secondary winding of a transformer TR1 in such a way that the voltages thereof are varied in opposite directions depending upon the voltage across the secondary winding of transformer TR1. The cathode 48k is connected to the negative side of the source completing the power circuit for the tube.

A circuit including the secondary winding of transformer TR2 and series resistor R5 is connected across the remaining two terminals of the bridge network formed by a tap on the secondary winding of transformer TR1 and the adjustable tap of potentiometer P4. A constant bias is applied to the control grids 48g and 48h by the connection of the tap of potentiometer P4 to the positive side of the source, the adjustment being such as to balance the plate currents of the tubes when the error signal is zero. A reference voltage having a frequency synchronized with the frequency of the voltage of the rotor winding of synchro unit S is applied to the primary winding of transformer TR2 providing simultaneous grid voltage variation of both sections of the tube 48 in synchronism with the output of synchro unit S.

The output side of the synchro unit S is connected across a normally unbalanced resistance bridge network including a pair of resistors R6 in opposite legs. Resistors R6 are of equal ohmic value which is higher than the ohmic values of the resistors in the remaining two legs, unbalancing the bridge. Additionally, resistors R6 are of material in which the resistance decreases as the applied voltage increases. Hence as the applied voltage to the bridge is increased the decreasing resistance of resistors R6 tends to decrease bridge unbalance. With this arrangement it is possible to increase the sensitivity of the amplifier to small error voltages and since the bridge unbalance is reduced by large error voltages, the range of voltages applied to the amplifier is not excessive.

The instantaneous phase relation of the error signal with respect to the reference voltages on the grid circuit of the tube 48 depends upon the direction of angular displacement of the aircraft with respect to the set course, and drives one grid more positive as the other is made less positive in a degree depending upon the extent of angular phase shift of the error signal, with respect to the reference signal. This push-pull operation of tube 48 unbalances the voltages of the tubes producing the course error voltage.

Summing up the foregoing electromagnetic biases on the individual gyroscopes, the turn rate gyroscope electromagnet assembly is controlled by a rudder motor velocity voltage, a rudder position voltage, a skid voltage from the skid voltage potentiometer SVP and a piloting voltage ($x$ to $z$) from the system of turn potentiometers of the transient turn co-ordinator.

The bank rate gyroscope electromagnet assembly is controlled by an aileron motor velocity voltage from bridge circuit terminals T2, an aileron position voltage taken from potentiometer AP, a bank voltage from bank voltage potentiometer BVP, a piloting voltage ($y$ to $x$) from the system of turn potentiometers and a course error voltage from the course control unit CU.

The pitch rate gyroscope electromagnet assembly is controlled by an elevator motor velocity voltage taken from bridge circuit terminals T3, an elevator position voltage from elevator potentiometer EP, a piloting voltage ($x$ to $z$) from the system of turn potentiometers producing upelevator, a piloting voltage from the pitch potentiometer PP for climbs and dives and a combined vertical rate and vertical position voltage from the vertical rate control VRC.

These biasing voltages for the three gyroscopes are applied in any operating order and in various magnitudes depending upon the control requirements of the specific operating condition and the circuit connections are as follows:

Considering the turn gyroscope electromagnet system, the velocity feedback voltage taken from terminals T1 and the skid voltage taken from skid voltage potentiometer SVP are added in series in a circuit extending from terminal T1 at the movable tap of potentiometer P1, through a portion of skid voltage potentiometer SVP to the tap thereof, through coils SV1 and SV2 respectively arranged on cores on opposite sides of the associated armature and terminating at the other terminal T1. Since coils SV1 and SV2 are on opposed cores with respect to the armature disposed therebetween opposed torques are produced about the turn rate gyroscope output axis. The rudder position feedback voltage is applied by the connection of the rudder potentiometer RP in a bridge circuit with coils RP1 and RP2, coil RP1 being on a core with coil SV1 and coil RP2 being on the core with coil SV2, so that movement of the tap of the rudder potentiometer unbalances the currents of coils RP1 and RP2 unbalancing the opposed torques resulting therefrom. The piloting voltage ($x$ to $z$) is applied across a pair of series connected coils XZ1 and XZ2 respectively disposed on oppositely disposed cores with coils RP1 and RP2 in a manner similar to coils SV1 and SV2.

While the magnetic effects of coils SV1 and SV2 and likewise the magnetic effects of coils XZ1 and XZ2 produce opposed torques about the turn rate gyroscope output axis due to their mounting on opposed core structures, the M. M. F.'s of the coils on the same core are arranged to add or subtract depending upon the control condition. If, for instance, coils RP1 and RP2 are regarded as the polarizing coils producing north poles on each core at the extremity adjacent the armature, then for one control condition the M. M. F.'s of coils SV1 and XZ1 may oppose that of coil RP1 reducing the total biasing flux on that side of the armature while on the other side of the armature the M. M. F.'s of coils SV2 and XZ2 will aid that of coil RP2 increasing the total biasing flux producing an unbalanced magnetic force acting in the direction of the core having the greater flux.

Also due to the biasing effect of coils RP1 and RP2 it will be appreciated that the response of the electromagnet system of the turn rate gyroscope is linear with respect to the energizing quantities for the several coils thereof and due to the fact that an armature assembly is employed in which overlapping gaps are provided the electromagnet system is relatively free of negative stiffness.

In the bank gyroscope electromagnet system, the velocity voltage and the bank voltage taken respectively from the pair of bridge circuit terminals T2 and the bank voltage potentiometer BVP are added in series in a circuit including a pair of coils BV1 and BV2 respectively disposed on opposite cores of the bank rate gyroscope electromagnet system. This circuit corresponds to its counterpart including coils SV1 and SV2 in the rudder section of the system. The aileron position voltage is applied by the connection of the aileron potentiometer AP in a bridge circuit with coils AP1 and AP2 in which the movable tap on AP controls the currents of coils AP1 and AP2. The piloting voltage ($y$ to $x$) is applied across series connected coils XY1 and XY2 respectively disposed on opposite cores. It is readily observed that this system of coils for the bank rate gyroscope electromagnet corresponds to that of the turn rate gyroscope electromagnet. The function thereof will be understood in connection with the description of the turn gyroscope electromagnet. The course error voltage is applied to coils CU1 and CU2 which are arranged on cores separate from those carrying coils AP1 and AP2 and the magnetic effects of the course control coils produce opposed and balanced torques about the bank rate gyroscope output axis when the craft is on course.

In the pitch gyroscope electromagnet system the velocity voltage is applied to coils EV1 and EV2 arranged on oppositely disposed cores and being connected in series across the bridge circuit terminals T3. The elevator position voltage is applied by means of a bridge circuit in which the tapped portions of potentiometer EP form adjacent legs and a pair of coils EP1 and EP2 form the remaining two adjacent legs, the movable tap of EP being connected between the coils EP1 and EP2 to control the current distribution between the coils. Here again the position coils EP1 and EP2 may be regarded as the polarizing coils producing north core poles adjacent the armature therefor. In one instance the M. M. F. of coil EV1 opposes that of coil EP1 while that of coil EV2 aids that of coil EP2. Reversal of the elevator motor velocity voltage reverses the effect of the M. M. F.'s. The pitch potentiometer voltage is also applied to coils on these same cores. In accomplishing this the pitch potentiometer forms two legs of a bridge circuit including coils PP1 and PP2 as the remaining adjacent legs. The current distribution of coils PP1 and PP2 is controlled by connection of the movable tap of pitch potentiometer PP between the coils. Push-pull motion of handwheel HW drives the movable tap of potentiometer PP to either side of neutral position correspondingly controlling the currents of coils PP1 and PP2. A trim potentiometer ETRP having its movable tap common with that of the pitch potentiometer trims the bias of coils PP1 and PP2 to correct for off-center conditions. Here also linearity of electromagnet response obtains due to the biasing effect of the opposed sets of coils. The biasing voltage from the turn potentiometer system ($x$ to $z$) is applied to a single coil XZ3 of the pitch rate gyroscope electromagnet system. This coil is arranged on a core separate from the others and is disposed with respect to the armature therefor to produce biasing forces about the output axis of the pitch rate gyroscope to effect up-elevator. In view of the absence of polarizing and biasing coils on this electromagnet the response is unidirectional irrespective of polarity of the $x$ to $z$ voltage and obeys the square law. Thus the provision of linear biases on the turn and bank rate gyroscopes and the square law bias on the pitch rate gyroscope matches the system control with the square law governing the relation of up-elevator to bank angle. The vertical rate and vertical position quantities of the vertical rate control VRC are applied to coils VR5 and VR6 in dependence of the operation of contact sets VR1 and VR2. These coils are respectively connected in series with contacts VR1 and VR2 and one coil or the other is energized depending upon which of contacts VR1 and VR2 is engaged by the movable contact associated therewith. Since a linear response is here desired a pair of biasing coils C1 and C2 are respectively applied to the oppositely disposed cores carrying the coils VR5 and VR6, coil C1 being on a core with coil VR5 and coil C2 being on a core with coil VR6. Coils C1 and C2 are connected in series across the power supply and their M. M. F.'s are in the same direction as that of the corresponding one of coils VR5 and VR6. The magnetic biasing effect of these coils with respect to coils VR5 and VR6 is such as to produce a linear magnet response to the current of coils VR5 or VR6. Thus it will be observed the hovering operation of the contacts of the gyroscopes as hereinbefore mentioned is influenced in each case by a multiplicity of magnetic biases which operate in varying degree and at various intervals to produce the required biasing effect on the gyroscopes of the system and if desired contact hovering may be augmented by introducing torsional vibration about the output axis of each gyroscope. In the instant case this is accomplished by providing a degree of dynamic unbalance in the rotating system of each gyroscope.

Recalling now the operating sequence of the control surfaces of an aircraft in initiating a turn as discussed in the opening pages of this descriptive disclosure it will be remembered that the ailerons are applied to initiate an angle of bank together with the timed application of the rudder and elevators in a degree corresponding to the instantaneous angles of bank to provide the required turn and pitch velocities. In the functional description of the turn co-ordinator system of the transient turn co-ordinator including the potentiometers TP$x$, TP$y$ and TP$z$ the voltages $y$ to $x$ and $x$ to $z$ are considered, the voltage $y$ to $x$ being the first produced biases the bank gyroscope initiating roll velocity for the accumulation of bank angle and as the voltage $y$ to $x$ is reduced to streamline the ailerons a second voltage is produced which biases the turn and pitch rate gyroscopes. Thus it will be observed that the control sequence outlined for the co-ordinated control of the surfaces maintaining equilibrium of the craft in a turn is obtained in the output of the turn potentiometers of the transient co-ordinator.

The control arrangement affording this function includes in addition to the turn potentiometer system a control motor CM and a control relay CR. The relay CR controls the speed and direction of operation of the motor and to this end is provided with a pair of stationary contacts CR1 and CR2 which are selectively engaged by a movable contact CR3. Contact CR3 is actuated by the armature assembly of the relay which includes a pair of movable armatures CR4 and CR5 the forces of which are opposed in the mounting of movable contact CR3. The circuit system of the contacts of the relay affords a control of the motor armature terminal voltage to regulate the motor speed and direction of operation. Thus the motor field is preferably maintained constant either by permanent magnet means or the constantly excited field CMF illustrated.

The control of the relay is effected by a multiplicity of coils associated with the respective armatures. Since a control of the turn potentiometer system is desired to produce the gyroscope biasing voltages $y$ to $x$ and $x$ to $z$ as previously described the voltage $y$ to $x$ is applied across relay coils XY3 and XY4 which are connected in series across movable taps $y$ and $x$. As in the case of the servomotors driving the control surfaces of the craft velocity damping of the control motor CM is also provided and is obtained from the bridge circuit including potentiometer P10 of which the tapped portions form adjacent legs and resistor R10 and the motor armature winding form the remaining adjacent legs. The bridge is balanced against the motor armature resistance when the motor is stationary and is unbalanced by the back E. M. F. produced during rotation and the voltage due to bridge unbalance is applied to coils CV1 and CV2 which are connected in series across the output terminals T10 of the bridge circuit and respectively occupy positions on relay armatures CR4 and CR5. The relay is polarized by coils C3 and C4 which are respectively connected in series with coils CU1 and CU2 in the plate circuits of the amplifier tube 48. Thus for a voltage across movable taps $y$ and $x$ of one polarity, the M. M. F. of coil XY3 will add to that of polarizing coil C3 while that of coil XY4 will subtract from the M. M. F. of coil C4 producing unbalanced magnetic pulls in a direction to engage movable contact CR3 with stationary contact CR1. Reversal of the polarity of voltage $y$ to $x$ of course reverses the magnetic pull and contact CR3 engages CR2. The velocity feedback voltage across terminals T10 is fed back in a negative sense, that is, the M. M. F. of coils CV1 and CV3 always opposes the M. M. F.'s of coils XY3 and XY4 respectively. The velocity voltage is independent of the motor load current by reason of the bridge circuit and as a consequence is zero when the motor stops. The circuit connections for energizing the motor armature circuit extend from a midtap $z$ on potentiometer TP$z$ representing the substantial midpoint of the source voltage through the movable contact CR3 and stationary contact CR1 to the positive side of the source or through movable contact CR3 and stationary contact CR2 to the negative side of the source affording reversible polarity motor armature excitation. The rotor of motor CM drives the movable tap $x$ of potentiometer TP$x$ through a suitable system of gears which provide the desired rate of movement of movable tap $x$ for a given motor speed so as to effect a rate of reduction of the voltage $y$ to $x$ corresponding to the time constant of the craft about the roll axis for a given air speed. With this circuit small voltages across the movable taps $y$ and $x$ will cause the relay contacts to apply full voltage to the motor armature for starting. As the negative feedback velocity voltage builds up with motor speed, a regulated motor speed results which is proportional to the voltage $y$ to $x$. This control is known to afford very good speed regulation at low motor speeds.

Thus to effect a turn the handwheel HW is rotated producing a voltage $y$ to $x$ which biases the bank rate gyroscope and the control relay CR. The control afforded by the bank rate gyroscopes displaces the ailerons and produces roll velocity. At the same time the operation of the control relay energizes motor CM which drives the movable tap $x$ in a direction to reduce the $y$ to $x$ voltage. As the $y$ to $x$ voltage is decreased the biasing effect thereof on the bank rate gyroscope decreases moving the ailerons to streamlined position as the bank angle for the turn indicated by the setting of handwheel operated potentiometer TP$y$ is accumulated. Simultaneously motion of the tap $x$ from neutral position produces a voltage between the movable tap $x$ and the tap $z$ of potentiometer TP$z$ which increases as the voltage $y$ to $z$ decreases. Hence, the voltage which biases the turn and pitch rate gyroscopes results in the application of the rudder and elevators in time phase with the bank angle producing the required turn and pitch velocities.

When the handwheel is rotated to turn the aircraft it is desirable to disconnect the course control unit CU from the system so that its biasing effect tending to steer the craft along a fixed course is removed and, at the same time, to reorient this unit properly for the heading of the craft upon completion of a turn, so that fixed course control may be resumed without delay. In a copending application of I. M. Holliday, G. R. Douglass and C. R. Hanna, Serial No. 785,984, filed November 14, 1947, entitled Control Systems, and assigned to the assignee of this invention, this is accomplished by the expedient of a switch S5 operated by the handwheel which effectively connects and disconnects the course control unit and the main control system. However, the return of the handwheel to neutral position results in closure of the switch reconnecting the course control unit. In larger types of craft requiring several seconds to level off from a turn in which the bank angle may have been of the order of 40 degrees, the course unit, if handwheel motion is rapid, may be connected in prior to the time the plane is leveled off for straight away flight and the course setting of the course unit is then slightly overshot by the craft resulting in several oscillations thereof about the indicated course prior to settling on the new course.

To avoid this it is preferred that the course unit shall remain disconnected until the craft has leveled off at which time reconnection of the course unit holds the craft on the instant heading at the time of leveling off. The structure by which this is accomplished is as follows:

The synchro unit S has a rotatable secondary winding, the rotative movements of which are controlled by a brake B. As previously described this secondary winding is connected to the input terminals of the normally unbalanced bridge circuit containing resistors R6 which in turn controls the grids 48g and 48h of tube 48 in conjunction with the reference signal applied through transformer TR2. Thus it will be appreciated that the angular position of the rotor winding of synchro unit S with respect to the flux pattern of the primary winding thereof determines the instant heading of the aircraft and when the rotor is locked to prevent rotation, tendencies of the aircraft to turn result in a shift of the flux pattern of the primary winding with respect to the rotor winding, producing the course error signal. The brake B is also provided with a contact set B1 which is closed when the brake is released. These contacts short the rotor winding of synchro S causing it to function as a repeater motor. It can, therefore, follow the rotating field of the primary winding during a turn.

The brake B is spring released and magnetically applied and its coil is connected in series across the power supply with the switch S5 actuated by the handwheel and switch S7 driven by control motor CM. Switch S5 is normally closed and as shown is opened for either direction of rotation of handwheel HW. Disregarding for the moment switch S7 if a turn is indicated by handwheel rotation, switch S5 is opened deenergizing the brake coil which is spring biased to its released position disengaging the rotor of synchro unit S and closing contacts B1 to short the rotor winding of synchro S. During the turn the rotating field of the synchro unit S caused by the changing orientation of the flux valve in the earth's magnetic field results in rotation of the rotor of the synchro in its function as a repeater motor, repeating the changing heading of the craft. Return of the handwheel to neutral promptly energizes the brake coil and the brake locks the rotor of the synchro. This, however, may occur prior to leveling off of the craft.

By suitably timing the operation of switch S5 in closing, a delay may be obtained in the reconnection or reslaving of the main section of the control system to the course control unit and this delay is preferably such as to reslave the system at the instant level flight is achieved. Inasmuch as the time delay varies depending upon the angle of bank and roll velocity a constant time delay is not completely satisfactory. It is therefore preferred to control the energization of brake B as some function of the angle of bank.

This may be accomplished by controlling a switch S7 connected in series in the brake circuit, by the control motor CM. As shown switch S7 is of the cam actuated type in which the cam is driven from the same shaft as the movable tap $x$ of potentiometer TPx. The switch is closed when the potentiometer is centered and opened when the potentiometer is moved either direction from center. By this means when the handwheel is rotated to effect a turn switch S5 immediately deenergizes the coil of brake B which releases the rotor of synchro S and shorts the rotor winding thereof forming a repeater motor of the device. The $y$ to $x$ voltage banks the craft and as the follow-up control of motor CM takes place the $y$ to $x$ voltage diminishes and voltage $x$ to $z$ appears introducing the required turn and pitch velocities for the instant angle of bank. Operation of potentiometer TPx opens switch S7. Upon the return of the handwheel to neutral position switch S5 closes but the brake coil circuit is yet open at switch S7. The voltage $y$ to $x$ is now reversed reversing the aileron application and the control motor energization. Control motor CM in driving potentiometer TPx to its neutral position now diminishes both the $y$ to $x$ and $x$ to $z$ voltages leveling off the craft substantially at the instant TPx is centered at which time switch S7 closes energizing the brake B braking the rotor of the synchro S and applying the fixed course signal to the system.

In the hereinbefore identified copending applications the signal of the course control unit is applied to the biasing coils of the turn rate gyroscope. This is a satisfactory arrangement inasmuch as the bank gyroscope biasing magnets are interlocked with the turn gyroscope system through the bank voltage potentiometer BVP, resulting in operation of the ailerons when the rudder servo system operates to product a bank angle corresponding to the indicated turn rate. Similarly the vertical rate control responsive to rates of elevation changes, produces up-elevator to provide the required pitch velocity for the actual turn rate and bank angle.

However, the circuit arrangement of this invention affords a co-ordinated turn during the correction of course errors through the application of the course error signal to the bank gyroscope and the control relay CR. Thus bank velocity for the accumulation of bank angle is initiated while the control relay CR operates motor CM to introduce the required degree of rudder and elevator application.

As noted in connection with the description of the course control unit CU, the biasing coil CU1 of the bank gyroscope is connected in series with control relay coil C4 in the circuit of plate 48a and the biasing coil CU2 is connected in series with coil C3 of the control relay in the circuit of plate 48b. Thus during a handwheel initiated turn when the output of synchro S is shorted from the amplifier, the plate currents of tube 48 are, for all practical purposes, equal and coils C3 and C4 function essentially as polarizing coils. But during periods of fixed course control when the handwheel is centered a course error signal unbalances the plate circuits of tube 48 producing an unbalance of currents through the coils which operate relay CR and starts motor CM running in a given direction. The $y$ to $x$ voltage applied to the coils XY1 and XY2 of the bank gyroscope produces a torque opposing that produced by coils CU1 and CU2 tending to move the ailerons to streamlined position as the bank angle is accumulated. Simultaneously the rudder and elevators are operated in view of the $x$ to $z$ voltage which operation of movable tap $x$ produces.

This function will be better understood from a detailed consideration of the operation. Assume, for instance, that handwheel HW is rotated to drive movable tap $y$ counterclockwise as viewed. This moves tap $y$ to a more negative point of potentiometer TP$y$ resulting in a voltage $y$ to $x$ in which the $x$ voltage is more positive than the $y$ voltage. Assume further that the M. M. F. relation of coils C3 and XY3 and C4 and XY4 is such as to produce the greater bias on armature CR4 of the control relay closing contacts CR3 and CR1 and energizing control motor CM in a direction to cause movable tap $x$ to follow movable tap $y$ to a point where its tapped voltage matches the voltage at $y$. The $y$ to $x$ voltage in which $x$ is more positive than $y$ will now be assumed to pull armature 32 of the bank rate gyroscope into the page as viewed initiating bank velocity and a bank angle. The voltage $x$ to $z$ which follows from movement of tap $x$ as above described produces the required turn and pitch velocities. It should be noted that the voltage at $z$ is more positive than the voltage at $x$ since $x$ follows $y$ to a point of more negative voltage.

When the handwheel is centered and fixed course operation obtains assume a course error requiring the same direction of banking for correction as the immediately above described turn. Coil CU2 will pull armature 32 of the bank rate gyroscope into the paper as viewed initiating a bank velocity in the same direction as for the assumed manually initiated turn above and simultaneously coil C3 of the control relay causes contacts CR3 and CR1 to close operating motor CM in a direction to move tap $x$ to a point of more negative voltage as before. Since tap $y$ is now centered the voltage at $y$ is more positive than $x$ which is the reverse of the assumed manually initiated turn and the $y$ to $x$ voltage now biases the armature 32 of the bank gyroscope out of the paper, as viewed, opposing the course error voltage bias and moving the ailerons towards streamlined position as the required bank angle is approached. The $x$ to $z$ voltage in which $z$ is more positive than $x$ is of the same polarity as for the assumed manually initiated turn and, hence, applies rudder and up-elevator in the required amount and direction.

For the manually initiated turn the M. M. F.'s of coils XY3 and C3 added while those of coils XY4 and C4 subtracted to produce a predominating pull on armature CR4 to close contacts CR3 and CR1. In the first instant for the assumed error during fixed course control, the effect of the increased excitation of coil C3 and the decreased excitation of coil C4 affords a predominating pull on armature CR4 to close contacts CR1 and CR3. However, for the assumed course error the $y$ to $x$ voltage is reversed in polarity, the M. M. F. of coil XY3 subtracting from that of coil C3 and the M. M. F. of coil XY4 adding to that of coil C4. Similarly the velocity of motor operation being the same as that for the assumed manually initiated turn the M. M. F.'s of coils CV1 and CV2 respectively subtract and add from those of coils C3 and C4. Thus operation of motor CM is damped in dependence of both velocity and position feedback quantities. At equilibrium the ailerons are streamlined and the control motor stops. As the course error decreases during the turn the predominating $y$ to $x$ voltage reverses the motor CM and reverses the aileron application to level the plane directly onto the new course.

With the control herein provided on the occurrence of a course error signal the introduction of bank velocity as the first step in producing a co-ordinated turn results in rapid response of the craft to the indicated error. Turning of the craft is made easier since a yawing moment in the proper direction results from the increased drag of the dropping wing. The up-elevator necessary to maintain altitude in bank attitude also provides the torque for a true turn about a distant point.

The compass recognizes the resultant heading change due to a yawing moment. This heading change has about the same time delay whether due to the rudder position or a yawing moment caused by a banking velocity. Thus a system advancing ailerons before rudder for heading changes offers operational stability comparable to those first advancing the rudder when the auto pilot is slaved to a directional gyro.

The foregoing disclosure and the showings made in the drawings are merely illustrative of the principles of this invention and are not to be considered in a limiting sense. The only limitations are to be determined from the scope of the appended claims.

I claim as my invention:

1. In a control for an aircraft having turn control means, roll control means and pitch control means, the combination of, a transient co-ordinator including an electromagnetically operated control member for producing control quantities for controlling all of said turn control means, said roll control means and said pitch control means; directional control means for producing an electrical directional control quantity indicative of the error in heading of said craft with respect to a predetermined heading, and circuit connections for applying said electrical directional control quantity to said electromagnetically operated control member of said transient co-ordinator to effect operation of said control member.

2. In a control for an aircraft having turn control means, roll control means and pitch control means, the combination of, a transient co-ordinator including an electromagnetically operated control member for producing control quantities for controlling all of said turn control means, said roll control means and said pitch control means; directional control means for producing an electrical directional control quantity indicative of the error in heading of said craft with respect to a predetermined heading, circuit connections for applying said electrical directional control quantity to said roll control means to bank said aircraft, and circuit connections for applying said electrical directional control quantity to said electromagnetically operated control member of said transient co-ordinator to effect operation of said control member.

3. In a control for an aircraft having ailerons, the combination of, a servo system for controlling said ailerons, a gyroscope arranged on said aircraft to respond to the velocity of roll thereof and produce an output torque in dependence of said velocity of roll, means responsive to the output torque of said gyroscope for controlling said servo system, a directional control system for producing a control quantity depending upon the error in heading of said aircraft with respect to a predetermined heading, and means responsive to said control quantity for controlling the output of said gyroscope.

4. In a control for an aircraft having a rudder, ailerons and an elevator, the combination of, a rudder servo system for driving the rudder, an aileron servo system for driving the ailerons and an elevator servo system for driving the elevator; a turn rate gyroscope for controlling the rudder servo system, a bank rate gyroscope for controlling the aileron servo system, and a pitch rate gyroscope for controlling the elevator servo system, a transient co-ordinator for producing control quantities for controlling each of the turn, bank and pitch rate gyroscopes, and a course control unit for controlling said transient co-ordinator.

5. In a control for an aircraft having a rudder, ailerons and an elevator, the combination of, a rudder servo system for driving the rudder, an aileron servo system for driving the ailerons and an elevator servo system for driving the elevator; a turn rate gyroscope for controlling the rudder servo system, a bank rate gyroscope for controlling the aileron servo system, and a pitch rate gyroscope for controlling the elevator servo system; a transient co-ordinator for producing control quantities for controlling each of the turn, bank and pitch rate gyroscopes; a course control unit for producing a directional control quantity depending upon the error in heading of said aircraft with respect to a predetermined heading, means for applying said directional control quantity to said bank gyroscope to control the output thereof, and means for applying said directional control quantity to said transient co-ordinator to effect operation thereof.

6. In a control for an aircraft having a rudder, ailerons and an elevator, the combination of, a rudder servo system for driving the rudder, an aileron servo system for driving the ailerons, an elevator servo system for driving the elevator, a turn gyroscope responsive to the velocity of motion of said aircraft about the turn axis thereof for controlling the rudder servo system, a bank gyroscope responsive to the velocity of motion of said aircraft about the roll axis thereof for controlling the aileron servo system, a pitch gyroscope responsive to the velocity of motion of said aircraft about the pitch axis thereof for controlling the elevator servo system, a manually operated potentiometer, a motor operated potentiometer, a motor for driving the motor operated potentiometer, electromagnetic means responsive to the voltage difference between the manually operated potentiometer and the motor operated potentiometer for controlling said motor, a fixed potentiometer, means responsive to the voltage difference of the manually operated potentiometer and the motor operated potentiometer for controlling the bank gyroscope, means responsive to the voltage difference between the motor operated potentiometer and the fixed potentiometer for controlling the turn gyroscope, means responsive to the voltage difference between the motor operated potentiometer and the fixed potentiometer for controlling the pitch gyroscope, course control means for producing an electrical quantity indicative of the error in heading of said craft with respect to a predetermined heading, and means for applying said electrical quantity to said electromagnetic means to effect operation thereof.

7. In a control for an aircraft having a rudder, ailerons and an elevator, the combination of, a rudder servo system for driving the rudder, an aileron servo system for driving the ailerons, an elevator servo system for driving the elevator, a turn gyroscope responsive to the velocity of motion of said aircraft about the turn axis thereof for controlling the rudder servo system, a bank gyroscope responsive to the velocity of motion of said aircraft about the roll axis thereof for controlling the aileron servo system, a pitch gyroscope responsive to the velocity of motion of said aircraft about the pitch axis thereof for controlling the elevator servo system, a manually operated potentiometer, a motor operated potentiometer, a motor for driving the motor operated potentiometer, electromagnetic means responsive to the voltage difference between the manually operated potentiometer and the motor operated potentiometer for controlling said motor, a fixed potentiometer, means responsive to the voltage difference of the manually operated potentiometer and the motor operated potentiometer for controlling the bank gyroscope, means responsive to the voltage difference between the motor operated potentiometer and the fixed potentiometer for controlling the turn gyroscope, means responsive to the voltage difference of the motor operated potentiometer and the fixed potentiometer for controlling the pitch gyroscope, course control means for producing an electrical quantity indicative of the error in heading of said craft with respect to a predetermined heading, means responsive to said electrical quantity for controlling said bank gyroscope, and means responsive to said electrical quantity for controlling said electromagnetic means.

8. In a control for an aircraft having control surfaces for maneuvering the craft, the combination of a control system for controlling the control surfaces, a course control unit for controlling the control system, a piloting member for controlling the control system, electromagnetic switching means for effectively connecting and disconnecting said course control unit with said control system, means for controlling said electromagnetic means including a pair of switches connected in series, means connecting one of said switches to be operated by said piloting member, and a follow-up control system responsive to said piloting member for operating the other of said switches.

9. In a control for an aircraft having control surfaces for maneuvering the craft, the combination of a control system for controlling the control surfaces, a course control unit for controlling the control system, a piloting member for controlling the control system, electromagnetic switching means for effectively connecting and disconnecting said course control unit with said control system, a pair of switches connected in series with said electromagnetic switching means for energizing the same, means connecting one of said switches to be operated by said piloting member, a first potentiometer operated by said piloting member, a second potentiometer, a motor for driving the second potentiometer, circuit means responsive to the voltage difference between the first and second potentiometers for energizing the motor, and means connecting the other of said pair of switches to be operated by said motor.

10. In a control for an aircraft having control surfaces for maneuvering the craft, the combination of, a control system for operating the control surfaces, a piloting member operable in each of two directions from a neutral position for controlling the control system, a course control unit, electromagnetic switching means operable when energized to connect the course control unit to said control system and operable when deenergized to effectively disconnect said course control unit and said control system, a pair of switches connected in series with said electromagnetic means and operable when closed to energize said electromagnetic switching means, means connecting said piloting means to operate one of said switches to open position for either direction of motion of said piloting member from said neutral position, and a follow-up control system responsive to movement of said piloting member in each of said two directions for operating the other of said pair of switches.

11. In a control for an aircraft having control surfaces for maneuvering the craft, the combination of, a control system for operating the control surfaces, a piloting member operable in each of two directions from a neutral position for controlling the control system, a course control unit, electromagnetic switching means operable when energized to connect the course control unit to said control system and operable when deenergized to effectively disconnect said course control unit and said control system, a pair of switches connected in series with said electromagnetic means operable when closed to energize said electromagnetic switching means, means connecting said piloting means to operate one of said switches to open position for either direction of motion of said piloting member from said neutral position, a first potentiometer operated by movement of said piloting member, a second potentiometer, motor means for operating the second potentiometer, circuit means responsive to the voltage difference of the first and second potentiometers for operating said motor means, and means connecting other of said pair of switches to be operated by said motor.

IVAR M. HOLLIDAY.

REFERENCES CITED

The following references are of record in the file of this patent:

UNITED STATES PATENTS

| Number | Name | Date |
|---|---|---|
| 2,144,616 | Carlson | Jan. 24, 1939 |
| 2,196,385 | DeFlorez | Apr. 9, 1940 |
| 2,283,754 | Matthews | May 19, 1942 |
| 2,373,315 | Kenyon | Apr. 10, 1945 |
| 2,415,430 | Frische et al. | Feb. 11, 1947 |
| 2,423,336 | Moseley | July 1, 1947 |
| 2,471,821 | Kutzler et al. | May 31, 1949 |